United States Patent
Sarangam et al.

(10) Patent No.: US 11,757,973 B2
(45) Date of Patent: Sep. 12, 2023

(54) TECHNOLOGIES FOR ACCELERATED HTTP PROCESSING WITH HARDWARE ACCELERATION

(71) Applicant: Intel Corporation, Santa Clara, CA (US)

(72) Inventors: Parthasarathy Sarangam, Portland, OR (US); Manasi Deval, Portland, OR (US); Gregory Bowers, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/889,678

(22) Filed: Aug. 17, 2022

(65) Prior Publication Data

US 2022/0394080 A1   Dec. 8, 2022

Related U.S. Application Data

(62) Division of application No. 16/022,949, filed on Jun. 29, 2018, now Pat. No. 11,451,609.

(Continued)

(51) Int. Cl.
*H04L 67/02* (2022.01)
*H04L 69/04* (2022.01)
(Continued)

(52) U.S. Cl.
CPC .......... *H04L 67/02* (2013.01); *H04L 63/0485* (2013.01); *H04L 69/04* (2013.01);
(Continued)

(58) Field of Classification Search
CPC ..... H04L 63/0428; H04L 67/02; H04L 69/04; H04L 69/164; H04L 69/166; H04L 63/0485

See application file for complete search history.

(56) References Cited

U.S. PATENT DOCUMENTS 7,058,696 B1    6/2006  Phillips et al.
7,426,636 B1 *  9/2008  McGrew ............... H04L 9/3236
                                                    713/160

(Continued)

OTHER PUBLICATIONS

Ex Parte Quayle Action for U.S. Appl. No. 16/022,949, Mailed Mar. 16, 2022, 7 pages.

(Continued)

*Primary Examiner* — Gil H. Lee
(74) *Attorney, Agent, or Firm* — Compass IP Law PC

(57) ABSTRACT

Technologies for accelerated HTTP message processing include a computing device having a network controller. The computing device may generate an HTTP message, frame the HTTP message to generate a transport protocol packet such as a TCP/IP packet or QUIC packet, and pass the transport protocol packet to the network controller. The network controller compresses the HTTP header of the HTTP message, encrypts the compressed HTTP message, and transmits the encrypted message to a remote device. The network controller may segment the transport protocol packet into multiple segmented packets. The network controller may receive transport protocol packets that include encrypted HTTP message. The network controller decrypts the encrypted HTTP message to generate a compressed HTTP message, decompresses the HTTP message, and steers the HTTP message to a receive queue based on contents of an HTTP header. The network controller may coalesce multiple transport protocol packets. Other embodiments are described and claimed.

14 Claims, 6 Drawing Sheets

Related U.S. Application Data

(60) Provisional application No. 62/644,048, filed on Mar. 16, 2018.

(51) Int. Cl.
- *H04L 69/166* (2022.01)
- *H04L 69/164* (2022.01)
- *H04L 9/40* (2022.01)

(52) U.S. Cl.
CPC .......... *H04L 69/164* (2013.01); *H04L 69/166* (2013.01); *H04L 63/0428* (2013.01)

(56) References Cited

U.S. PATENT DOCUMENTS

| | | | |
|---|---|---|---|
| 8,638,724 B1 | | 1/2014 | Knoop et al. |
| 10,397,185 B1 * | | 8/2019 | Sandholm ............. H04L 63/102 |
| 2011/0035469 A1 | | 2/2011 | Smith et al. |
| 2017/0061138 A1 | | 3/2017 | Lambert |
| 2017/0126565 A1 | | 5/2017 | Wang et al. |
| 2019/0229903 A1 * | | 7/2019 | Balasubramanian ........................ H04L 63/166 |
| 2021/0232331 A1 * | | 7/2021 | Kannan ................. G06F 3/0631 |

OTHER PUBLICATIONS

Final Office Action for U.S. Appl. No. 16/022,949, dated Dec. 2, 2021, 18 pages.

First Office Action for U.S. Appl. No. 16/022,949, dated Jul. 15, 2021, 17 pages.

Notice of Allowance for U.S. Appl. No. 16/022,949, dated May 31, 2022, 8 pages.

Restriction Requirement for U.S. Appl. No. 16/022,949, dated May 20, 2021, 6 pages.

\* cited by examiner

TECHNOLOGIES FOR ACCELERATED HTTP PROCESSING WITH HARDWARE ACCELERATION

CROSS-REFERENCE TO RELATED APPLICATION

This application is a divisional of U.S. patent application Ser. No. 16/022,949, filed Jun. 29, 2018, entitled "TECHNOLOGIES FOR ACCELERATED HTTP PROCESSING WITH HARDWARE ACCELERATION," which in turn claims the benefit of U.S. Provisional Patent Application 62/644,048, filed Mar. 16, 2018, entitled "TECHNOLOGIES FOR ACCELERATED HTTP PROCESSING WITH HARDWARE OFFLOADS," both of which are incorporated in their entirety herewith.

BACKGROUND

Many popular internet applications communicate using HTTP (Hypertext Transport Protocol). HTTP is an application-layer protocol used to exchange hypertext, such as web pages and related resources. Typically, a client such as a web browser sends an HTTP request to a web server. The HTTP request typically includes a request method (e.g., an action or verb) and an object, which may be an identified resource. The HTTP request may also include header fields and, for some requests, a message body. The server responds with an HTTP response, which may include a status code, header fields, and a message body. The HTTP header and payload may be compressed. The HTTP header and payload may also be encrypted using SSL (Secure Sockets Layer) or TLS (Transport Layer Security). The HTTP messages are transmitted between the client and server using a transport protocol such as TCP/IP or QUIC (described below). Since the HTTP headers are compressed and encrypted, the plain text content of those headers are typically not accessible to the network interface controller (NIC) hardware of either the client or server device.

QUIC (Quick UDP Internet Connections) is a relatively new network protocol that may be used to replace traditional network protocols such as Transmission Control Protocol (TCP). QUIC is a transport layer protocol built on top of UDP (User Datagram Protocol). QUIC supports a set of multiplexed connections between two endpoints over UDP, and may provide security protection equivalent to TLS/SSL, along with reduced connection and transport latency, and bandwidth estimation in each direction to avoid congestion. Thus, QUIC is intended to provide improved encryption and improved connection latency compared to traditional protocols such as TCP, while also providing flexible congestion management and compatibility with existing network infrastructure. Although relatively new, QUIC already forms 7% of all Internet traffic, and certain large network users are currently enabling QUIC. Current QUIC protocol implementations (e.g., user mode protocol stacks and libraries) are fully implemented in software.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
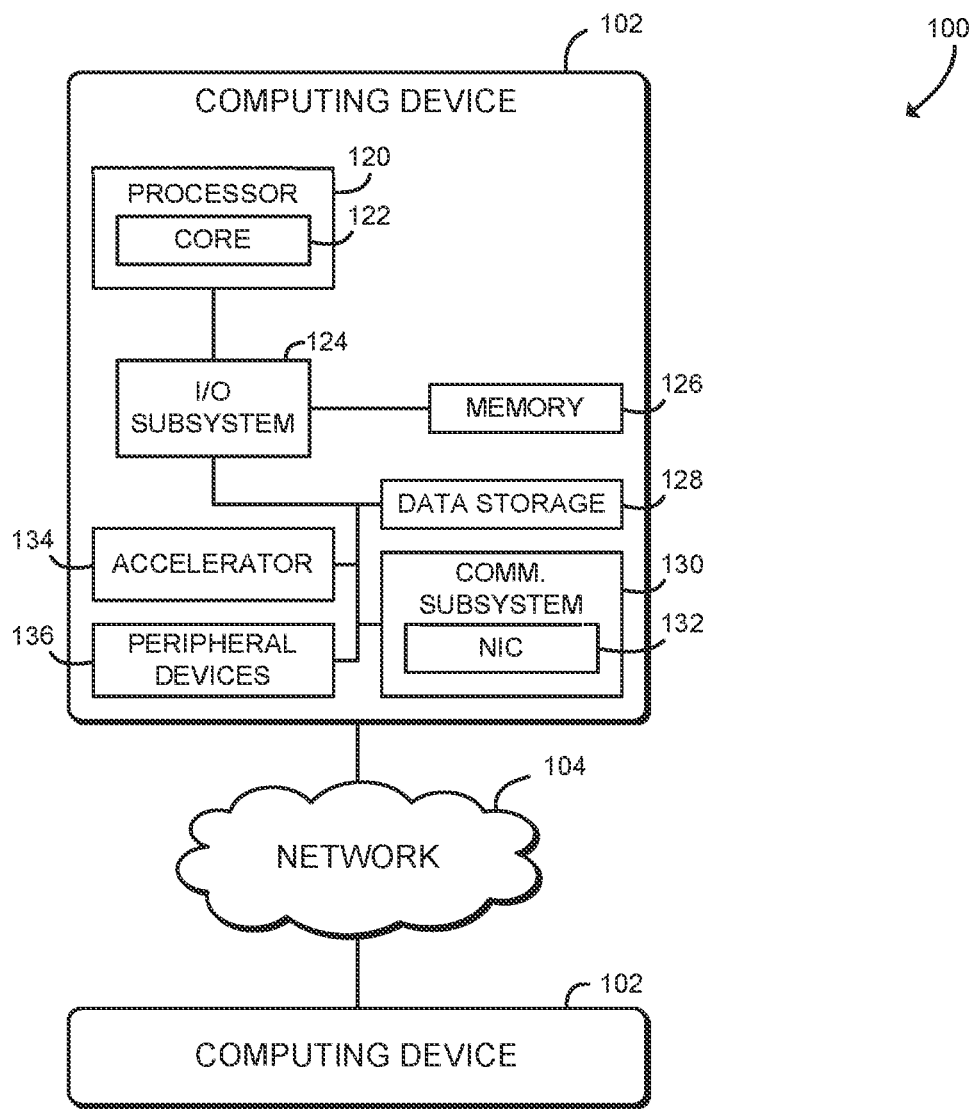
FIG. 1 is a simplified block diagram of at least one embodiment of a system for accelerated HTTP message processing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for accelerated HTTP message processing includes multiple computing devices 102 in communication over a network 104. Each computing device includes hardware accelerator support for flexible HTTP message processing. On transmit, the hardware accelerator may compress the HTTP message, segment the HTTP message into multiple transport protocol packets, and/or encrypt the HTTP message. On receive, the hardware accelerator may decrypt the HTTP message, coalesce transport packets into a single HTTP message, decompress the HTTP message, and/or selectively steer the HTTP message to a processor core based on contents of the HTTP message. Thus, the computing device 102 may provide greatly improved HTTP packet processing performance, providing improved throughput and reduced processor usage when compared to software-only HTTP packet processing used by current solutions, especially for large data rates. Additionally, hardware accelerated HTTP message packet processing may reduce processor cycle usage of the host processor, providing value for cloud service providers. For example, hardware offload of compression or cryptography may free up about 10-12 processor cores for each of those operations when processing about 200 Gbps of HTTP data. As another example, hardware offload of packet segmentation may free up about 10 processor cores when processing about 200 Gbps of HTTP data.

Each computing device 102 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively include a processor 120, an input/output subsystem 124, a memory 126, a data storage device 128, a communication subsystem 130, an accelerator 134, and/or other components and devices commonly found in a server or similar computing device. Of course, the computing device 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 is illustratively a multi-core processor, however, in other embodiments the processor 120 may be embodied as a single or multi-core processor(s), digital signal processor, microcontroller, or other processor or processing/controlling circuit. The illustrative processor 120 includes multiple processor cores 122, each of which is an independent, general-purpose processing unit capable of executing programmed instructions. For example, each processor core 122 may execute instructions from a general-purpose instruction set architecture (ISA) such as IA-32 or Intel® 64. Although illustrated with one processor core 122, in some embodiments the processor 120 may include a larger number of processor cores 122, for example four processor cores 122, fourteen processor cores 122, twenty-eight processor cores 122, or a different number. Additionally, although illustrated as including a single processor 120, in some embodiments the computing device 102 may be embodied as a multi-socket server with multiple processors 120.

The memory 126 may be embodied as any type of volatile or non-volatile memory or data storage capable of performing the functions described herein. In operation, the memory 126 may store various data and software used during operation of the computing device 102 such operating systems, applications, programs, libraries, and drivers. The memory 126 is communicatively coupled to the processor 120 via the I/O subsystem 124, which may be embodied as circuitry and/or components to facilitate input/output operations with the processor 120, the accelerator 134, the memory 126, and other components of the computing device 102. For example, the I/O subsystem 124 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 102, on a single integrated circuit chip.

The data storage device 128 may be embodied as any type of device or devices configured for short-term or long-term storage of data such as, for example, memory devices and circuits, memory cards, hard disk drives, solid-state drives, non-volatile flash memory, or other data storage devices. The computing device 102 also includes the communication subsystem 130, which may be embodied as any communication circuit, device, or collection thereof, capable of enabling communications between the computing device 102 and other remote devices over the computer network 104. For example, the communication subsystem 130 may be embodied as or otherwise include a network interface controller (NIC) 132 or other network controller for sending and/or receiving network data with remote devices. The NIC 132 may be embodied as any network interface card, network adapter, host fabric interface, network coprocessor, or other component that connects the computing device 102 to the network 104. The communication subsystem 130 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication.

In some embodiments, the communication subsystem 132 and/or the NIC 132 may form a portion of an SoC and be incorporated along with the processor 120 and other components of the computing device 102 on a single integrated circuit chip.

As shown in FIG. 1, the computing device 102 also may include the accelerator 134. The accelerator 134 may be embodied as a field-programmable gate array (FPGA), an application-specific integrated circuit (ASIC), an embedded digital logic block, a coprocessor, or other digital logic device capable of performing accelerated network functions. Although illustrated as separate components, it should be understood that in some embodiments the accelerator 134 may be incorporated in or otherwise coupled to the NIC 132. Additionally or alternative, in some embodiments, the accelerator 134 may be embodied as an FPGA included in a multi-chip package with the processor 120 and the NIC 132. The accelerator 134 may be coupled to the processor 120 and/or the NIC 132 via multiple high-speed connection interfaces including coherent and/or non-coherent interconnects.

The computing device 102 may further include one or more peripheral devices 136. The peripheral devices 136 may include any number of additional input/output devices, interface devices, and/or other peripheral devices. For example, in some embodiments, the peripheral devices 136 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

The computing devices 102 may be configured to transmit and receive data with each other and/or other devices of the system 100 over the network 104. The network 104 may be embodied as any number of various wired and/or wireless networks. For example, the network 104 may be embodied as, or otherwise include, a wired or wireless local area network (LAN), and/or a wired or wireless wide area network (WAN). As such, the network 104 may include any number of additional devices, such as additional computers, routers, and switches, to facilitate communications among the devices of the system 100. In the illustrative embodiment, the network 104 is embodied as a local Ethernet network.

Figure 2:
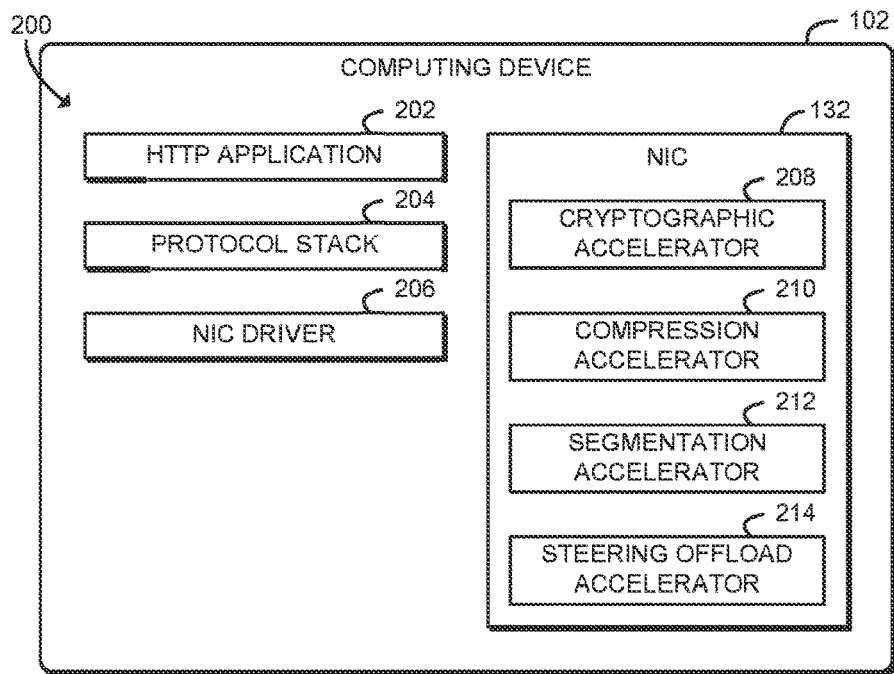
FIG. 2 is a simplified block diagram of at least one embodiment of an environment of a computing device of FIG. 1.

Referring now to FIG. 2, in an illustrative embodiment, the computing device 102 establishes an environment 200 during operation. The illustrative environment 200 includes an HTTP application 202, a protocol stack 204, a NIC driver 206, and the NIC 132. The NIC 132 further includes a cryptographic accelerator 208, a compression accelerator 210, a segmentation accelerator 212, and a steering offload accelerator 214. As shown, the various components of the environment 200 may be embodied as hardware, microcode, firmware, software, or a combination thereof. As such, in some embodiments, one or more of the components of the environment 200 may be embodied as circuitry or collection of electrical devices (e.g., HTTP application circuitry 202, protocol stack circuitry 204, driver circuitry 206, cryptographic accelerator circuitry 208, compression accelerator circuitry 210, segmentation accelerator circuitry 212, and/or steering offload accelerator circuitry 214). It should be appreciated that, in such embodiments, one or more of the HTTP application circuitry 202, the protocol stack circuitry 204, the driver circuitry 206, the cryptographic accelerator circuitry 208, the compression accelerator circuitry 210, the segmentation accelerator circuitry 212, and/or the steering offload accelerator circuitry 214 may form a portion of the processor 120, the NIC 132, the accelerator 134, the I/O subsystem 124, and/or other components of the computing device 102. In the illustrative embodiment, the HTTP application 202, the protocol stack 204, and the NIC driver 206 are executed by one or more processor cores 122 of the processor 120, and the cryptographic accelerator 208, the compression accelerator 210, the segmentation accelerator 212, and the steering offload accelerator 214 are embodied as hardware, firmware, microcode, or other resources of the NIC 132. Additionally or alternatively, in some embodiments, the cryptographic accelerator 208, the compression accelerator 210, the segmentation accelerator 212, and/or the steering offload accelerator 214 may be embodied as or otherwise included in one or more standalone accelerators 134. Additionally, in some embodiments, one or more of the illustrative components may form a portion of another component and/or one or more of the illustrative components may be independent of one another.

The HTTP application 202 may be configured to generate HTTP messages (e.g., HTTP requests and/or HTTP responses) for transmission and/or to process received HTTP messages. For example, the HTTP application 202 may be embodied as a web server, a web browser, a web API server, a web API client, or other HTTP-enabled application executed by the computing device 102. Each HTTP message may be embodied as an application-layer protocol message that includes one or more HTTP headers and, optionally, an HTTP body. The protocol stack 204 is configured to frame each HTTP message for transmission to generate one or more transport protocol packets that include the HTTP message. The transport protocol packets may be embodied as TCP/IP packets or QUIC packets.

The NIC driver 206 is configured to pass the transport protocol packets to the NIC 132 of the computing device for transmission. In some embodiments, the NIC driver 206 is further configured to configure a transmit pipeline of the NIC 132. The transmit pipeline includes an offload ordering, which may specify an order of compression, encryption, segmentation, and other hardware offloads.

The NIC 132 is configured to execute a transmit pipeline to control transmission of the transport protocol packets to a remote computing device. For example, the NIC 132 may transmit the transport protocol packets to the remote computing device and/or cause another device such as a network port or other physical interface to transmit the transport protocol packets to the remote computing device. The transport protocol packets may be transmitted after compression, encryption, and in some embodiments segmentation. The transmit pipeline may be executed in the order specified by the offload ordering, which may be fixed or configured by the NIC driver 206.

The compression accelerator 210 is configured to compress the HTTP header of the HTTP message of the transport protocol packet to generate a compressed HTTP message. The HTTP header may be compressed with an HPACK compression algorithm (for TCP/IP) or a QPACK compression algorithm (for QUIC). The compression accelerator 210 may be further configured to compress the HTTP body of the HTTP message to generate the compressed HTTP message, for example with a DEFLATE compression algorithm. The HTTP message may be compressed in response to passing the HTTP message to the NIC 132 (e.g., prior to segmentation) or in some embodiments in response to the NIC 132 segmenting the HTTP message into multiple transport protocol packets.

The cryptographic accelerator 208 is configured to encrypt the compressed HTTP message of the transport protocol packet to generate an encrypted HTTP message (e.g., encrypted HTTP headers and, if present, encrypted HTTP body) in response to compressing the HTTP message. The HTTP message may be encrypted in response to the NIC 132 segmenting the HTTP message into multiple transport protocol packets (e.g., each of the multiple transport protocol packets may be encrypted).

The segmentation accelerator 212 is configured to segment the transport protocol packet to generate multiple segmented transport protocol packets. The segmentation accelerator 212 may be further configured to report a count of the segmented transport protocol packets to the computing device 102 (e.g., to the NIC driver 206) in response to segmenting the transport protocol packet. The transport protocol packet may be segmented in response to compressing the HTTP message (e.g., the compressed packet may be segmented), in response to passing the transport protocol packet to the NIC (e.g., the plaintext packet may be segmented), or in response to encrypting the HTTP message (e.g., the encrypted packet may be segmented).

In some embodiments, the NIC driver 206 may be further configured to configure a receive pipeline of the network controller 132. The receive pipeline includes an offload ordering, which may specify an order of compression, encryption, segmentation, steering, and other hardware offloads. The NIC driver 206 may be further configured to configure the NIC 132 with the filter criteria and the associated filter action.

The NIC 132 is further configured to execute a receive pipeline to receive transport protocol packets from a remote computing device. The transport protocol packets may be embodied as TCP/IP packets or QUIC packets. The received transport protocol packets include an encrypted HTTP message. Executing the receive pipeline may include decompression, decryption, and in some embodiments coalescing the received transport protocol packets. The receive pipeline may be executed in the order specified by the offload ordering, which may be fixed or configured by the NIC driver 206.

The cryptographic accelerator 208 is configured to decrypt the encrypted HTTP message of the received transport protocol packets to generate a compressed HTTP message. The HTTP message may be decrypted in response to receiving multiple segmented transport protocol packets (e.g., before coalescing the packets), or in response to coalescing multiple segmented transport protocol packets.

The compression accelerator 210 is configured to decompress the compressed HTTP message of the transport protocol packet to generate an HTTP message. The uncompressed HTTP message may be embodied as an application-layer protocol message that includes one or more HTTP headers and, optionally, an HTTP body. Decompressing the compressed HTTP message may include decompressing a compressed HTTP header with an HPACK compression algorithm (for TCP/IP) or a QPACK compression algorithm (for QUIC). Decompressing the compressed HTTP message may further include decompressing a compressed HTTP body, for example with a DEFLATE compression algorithm. The HTTP message may be decompressed in response to receiving multiple segmented transport protocol packets (e.g., before coalescing the packets) or in response to coalescing multiple segmented transport protocol packets.

The segmentation accelerator 212 is configured to coalesce multiple segmented transport protocol packets to generate a transport protocol packet. The multiple segmented transport protocol packets may be coalesced in response to decrypting of the encrypted HTTP message (e.g., coalescing plain text, compressed packets); in response to decompression of the compressed HTTP message (e.g., coalescing uncompressed packets), or in response to receiving the multiple transport protocol packets (e.g., coalescing encrypted, compressed packets).

The steering offload accelerator 214 is configured to steer the HTTP message to a receive queue based on the HTTP header in response to decompression of the compressed HTTP message. Steering the HTTP message may include determining whether the HTTP header of the HTTP message matches a filter criteria and, if so, performing a filter action associated with the filter criteria. The filter criteria may include an HTTP action and/or an HTTP object. The filter action may include selecting a processor core 122 to process the HTTP message, dropping the HTTP message, or throttling the HTTP message. The HTTP message may be steered in response to coalescing multiple segmented transport protocol packets.

The protocol stack 204 is configured to process HTTP messages from receive queues by an associated processor core 122 in response to steering the HTTP messages. The HTTP application 202 may also be configured to process received HTTP messages by the processor cores 122.

Figure 3:
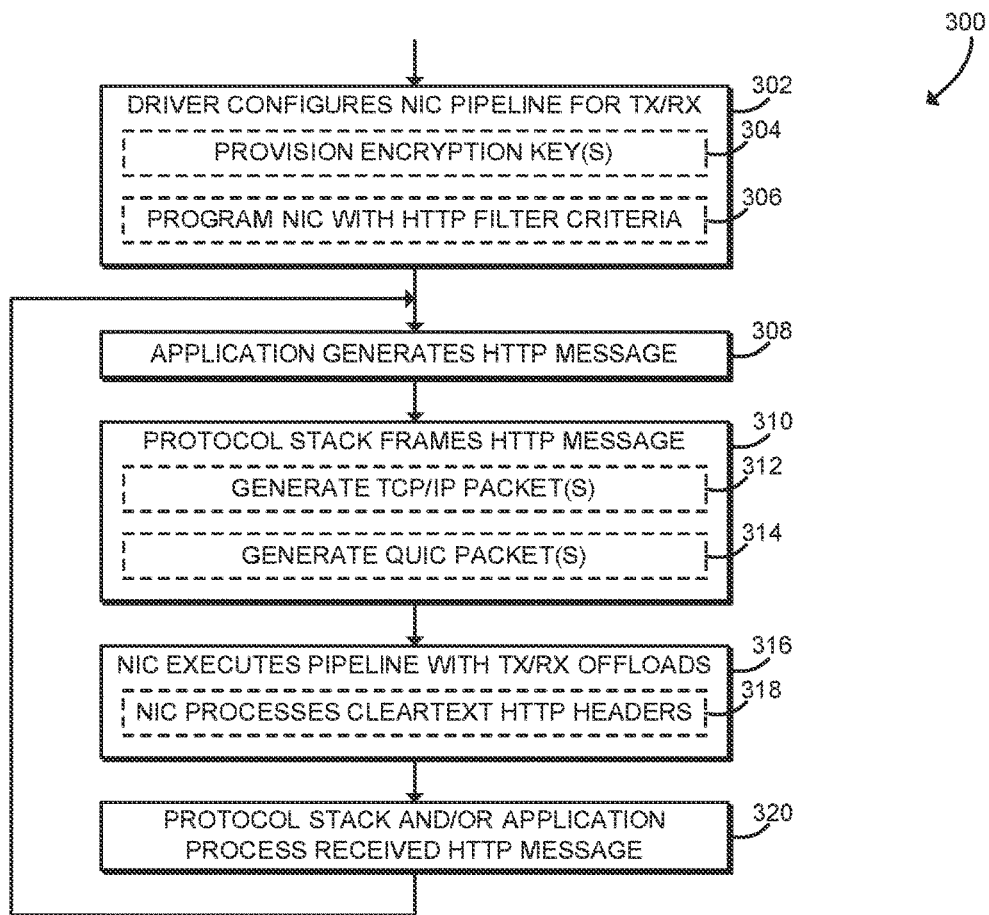
FIG. 3 is a simplified flow diagram of at least one embodiment of a method for accelerated HTTP message processing that may be executed by a computing device of FIGS. 1-2.
Figure 4:
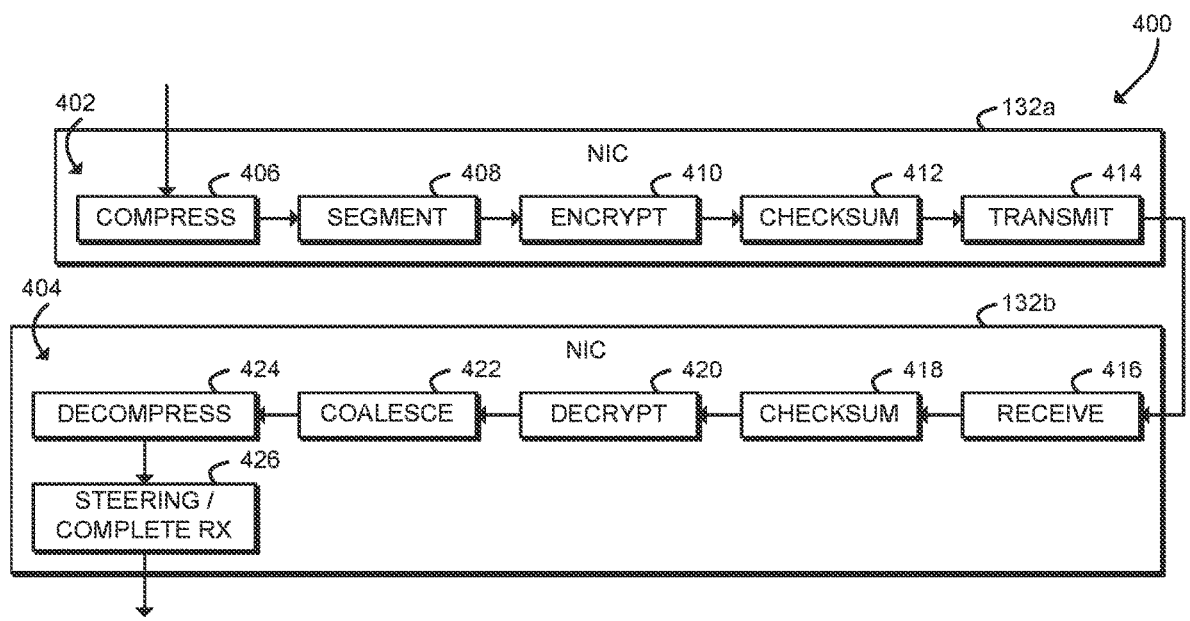
FIG. 4 is a schematic diagram illustrating at least one embodiment of packet processing pipelines that may be established by the system of FIGS. 1-2.
Figure 5:
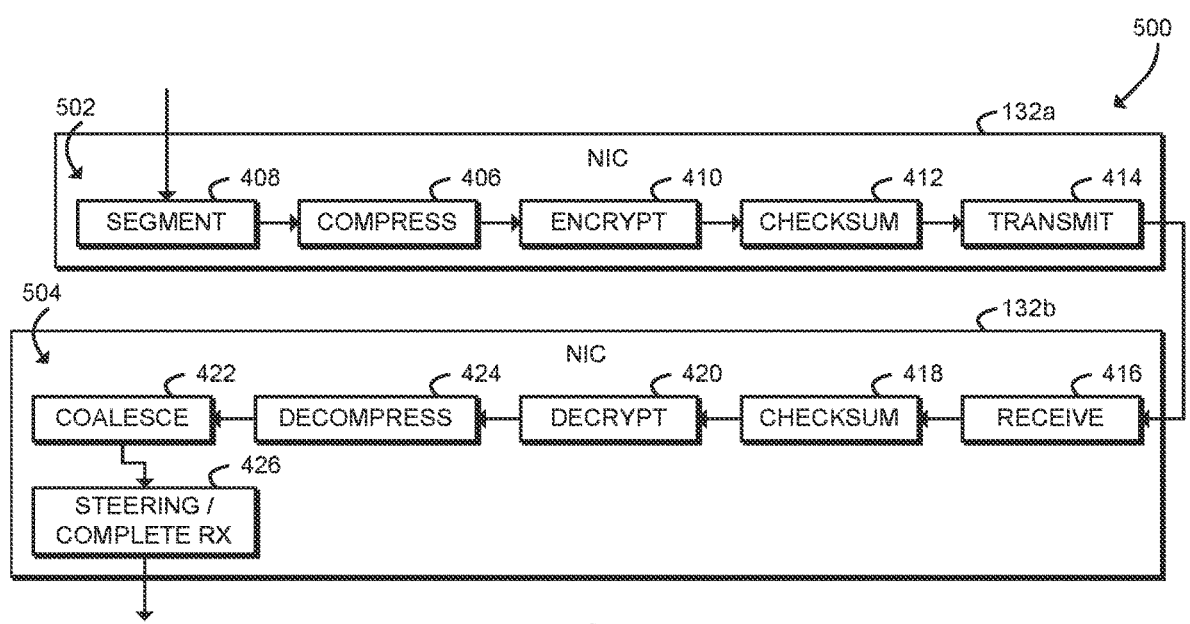
FIG. 5 is a schematic diagram illustrating another embodiment of packet processing pipelines that may be established by the system of FIGS. 1-2.
Figure 6:
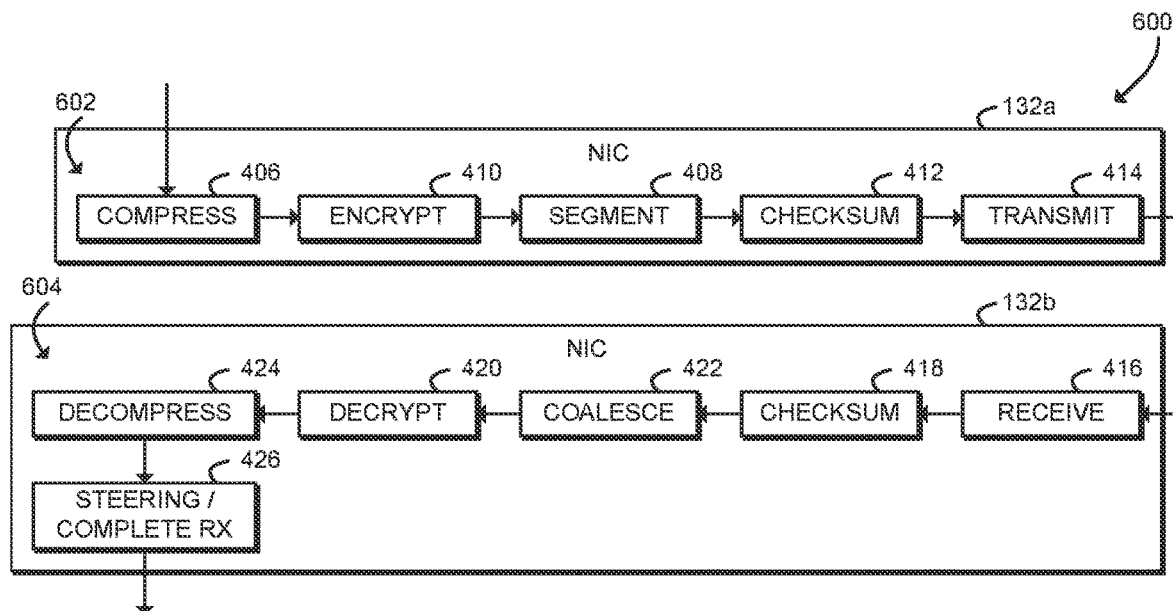
FIG. 6 is a schematic diagram illustrating yet another embodiment of packet processing pipelines that may be established by the system of FIGS. 1-2.

Referring now to FIG. 3, in use, the computing device 102 may execute a method 300 for accelerated HTTP message processing. It should be appreciated that, in some embodiments, the operations of the method 300 may be performed by one or more components of the environment 200 of the computing device 102 as shown in FIG. 2. The method 300 begins in block 302, in which the NIC driver 206 configures a NIC 132 pipeline for transmitting and/or receiving HTTP messages. The NIC driver 206 may, for example, select which hardware offloads to enable in the NIC 132, select the ordering of hardware offloads, or otherwise configure the NIC 132 prior to processing HTTP messages. Potential HTTP processing NIC 132 pipelines are illustrated in FIGS. 4-6 and described further below. The order of the NIC 132 pipeline may be determined based on hardware capabilities, application requirements, overall efficiency, or other criteria. For example, in some embodiments the NIC 132 pipelines shown in FIG. 4 may be more efficient than the NIC 132 pipelines shown in FIGS. 5 and 6.

In some embodiments, in block 304 the NIC driver 206 programs the NIC 132 with one or more encryption keys associated with a secure connection (e.g., with a particular SSL/TLS connection). The NIC 132 may be programmed with the encryption keys when a secure connection is opened with a remote host or when the secure connection is otherwise initialized. The encryption keys may be established with the remote host, for example, using a secure key exchange or other secure process. The encryption keys may be stored by the NIC 132 for the lifetime of the associated secure connection, or in some embodiments, may change during the lifetime of the associated secure connection. In some embodiments, in block 306, the NIC driver 206 may program the NIC 132 with one or more TP filter criteria, which may be used to steer or otherwise filter received HTTP messages.

In block 308, the HTTP application 202 generates an HTTP message in an application stream, application buffer, or other memory buffer. The HTTP message may be embodied as an HTTP request or an HTTP response. The HTTP message may include multiple HTTP headers and in some embodiments may include an HTTP body, such as a hypertext resource, image resource, or other data payload. The HTTP message illustratively conforms to an HTTP/1.1 specification; in other embodiments, the HTTP message may conform to HTTP/1.0, HTTP/2, or other HTTP specification.

In block 310, the protocol stack 204 frames the HTTP message in one or more transport-layer protocol packets. The protocol stack 204 may add or otherwise frame the HTTP message data with headers or other data to create the transport-layer protocol packet. The protocol stack 204 may use any appropriate transport-layer protocol to frame the HTTP message. In some embodiments, in block 312 the protocol stack 204 may generate one or more TCP/IP packets. In some embodiments, in block 314 the protocol stack 204 may generate one or more QUIC packets.

In block 316, the NIC 132 executes a transmit pipeline and/or a receive pipeline that includes one or more transmit offloads and/or receive offloads, respectively. In some embodiments, in block 318 the NIC 132 may process one or more clear text HTTP headers during execution of the transmit offloads and/or receive offloads. As described further below, the transmit pipeline may include compressing the HTTP message, segmenting the transport-layer protocol packet into multiple, smaller packets, and/or encrypting the HTTP message. The receive pipeline may include decompressing the HTTP message, coalescing multiple transport-layer protocol packets into a single HTTP message, decrypting the HTTP message, and/or steering received HTTP messages to particular processor cores 122. One potential embodiment of a method for encrypting and decrypting the HTTP message is described below in connection with FIG. 7. One potential embodiment of a method for compressing and decompressing the HTTP message is described below in connection with FIG. 8. One potential embodiment of a method for segmenting the transport-layer protocol packet is described below in connection with FIG. 9. One potential embodiment of a method for steering and filtering the HTTP message is described below in connection with FIG. 10.

In block 320, the protocol stack 204 and/or the HTTP application 202 may process received HTTP messages. For example, the protocol stack 204 may process headers or other data associated with received transport-layer protocol packets that include the HTTP message, and the HTTP application 202 may process the HTTP message. Processing by the protocol stack 204 and the HTTP application 202 may be performed by one or more processor cores 122 of the computing device 102. After processing the HTTP messages, the method 300 loops back to block 308 to continue sending and receiving HTTP messages. Additionally or alternatively, although illustrated in FIG. 3 as transmitting HTTP messages and then receiving HTTP messages, it should be understood that a computing device 102 may perform either of those operations in a different order and/or independently. For example, a web server may process HTTP requests received from client devices before transmitting HTTP responses to the client. As another example, in some embodiments an HTTP-enabled device may transmit HTTP requests without processing HTTP responses and/or may process received HTTP requests without transmitting HTTP responses.

Referring now to FIG. 4, schematic diagram 400 illustrates packet processing pipelines that may be established by the system 100. Illustratively, a transmit pipeline 402 is established by a NIC 132a, which may be including in a transmitting computing device 102, and a receive pipeline 404 is established by a NIC 132b, which may be included in a receiving computing device 102. The operations of each pipeline 402, 404 may be performed by one or more components of an environment 200 of a computing device 102 as shown in FIG. 2. For example, each stage of the pipelines 402, 404 may be embodied as hardware, microcode, firmware, or other resources of the respective NIC 132a, 132b. As described above, the pipelines 402, 404 may be configured by the NIC driver 206 of the respective computing device 102.

As shown in FIG. 4, an HTTP message for transmission is provided to a compression stage 406 of the transmit pipeline 402. The HTTP message may be framed in a transport-layer protocol packet such as a TCP/IP packet or a QUIC packet. The compression stage 406 compresses the HTTP headers and the HTTP body of the HTTP message using an appropriate compression algorithm, which may depend on the underlying transport-layer protocol packet format. The compressed HTTP message is provided to a segmentation stage 408, which may segment or otherwise divide the HTTP message into multiple, smaller transport-layer protocol packets. For example, a single HTTP message may be larger than a maximum segment size (MSS) of the network 104 or other components of the system 100, and the segmentation stage 408 may generate multiple packets that are each smaller than the MSS. The segmentation stage 408 may also report the number of generated packets back to the NIC driver 206 or other software executed by the processor core 122. After segmentation, the segmented packets are provided to an encryption stage 410, which encrypts the HTTP message, for example using SSL/TLS. The encrypted packets are provided to a checksum stage 412, which calculates a checksum or other data that may be used to verify, authenticate, or otherwise validate the encrypted packets. The checksum data may be appended to or otherwise added to the encrypted packets. The encrypted packets are provided to a transmit stage 414, which transmits the encrypted packets over the network 104 to the receiving computing device 102.

The encrypted, transport-layer protocol packets are received by a receive stage 416 of the receive pipeline 404. The NIC 132 may parse packet headers of incoming network packets and recognize transport-layer protocol packets via a runtime configuration. For example, the NIC 132 may recognize QUIC packets as UDP packets with specific destination ports. In that example, the port numbers are supplied by the NIC driver 206. The received packets are provided to a checksum stage 418, which verifies the checksum or other data included in each received packet. After verifying the checksum data, the received packets are provided to a decryption stage 420, which decrypts the encrypted HTTP message included in the received packets. After decryption, the decrypted packets are provided to a coalesce stage 422, which may combine multiple received transport-layer protocol packets into a single HTTP message. The coalesced HTTP message is provided to a decompression stage 424, which decompresses the HTTP headers and the HTTP body using an appropriate compression algorithm. In some embodiments, the NIC 132 hardware may receive and hold all packets containing a single compressed header/body pair before decompression. In some embodiments, the NIC 132 hardware may decompress packets as they arrive while tracking packet to buffer state. The decompressed HTTP message is provided to a steering/completion stage 426, which writes the received HTTP message to a receive queue or other receive buffer. The steering/completion stage 426 may analyze the content of one or more HTTP headers to identify a particular receive queue or otherwise filter the received HTTP messages.

Referring now to FIG. 5, schematic diagram 500 illustrates additional packet processing pipelines that may be established by the system 100. Illustratively, a transmit pipeline 502 is established by a NIC 132a, which may be including in a transmitting computing device 102, and a receive pipeline 504 is established by a NIC 132b, which may be included in a receiving computing device 102. As described above, the operations of each pipeline 502, 504 may be performed by one or more components of an environment 200 of a computing device 102 as shown in FIG. 2. For example, each stage of the pipelines 502, 504 may be embodied as hardware, microcode, firmware, or other resources of the respective NIC 132a, 132b. As described above, the pipelines 502, 504 may be configured by the NIC driver 206 of the respective computing device 102.

As shown in FIG. 5, an HTTP message for transmission is provided to the segmentation stage 408 of the transmit pipeline 502. The segmentation stage 408 may segment or otherwise divide the HTTP message into multiple, smaller transport-layer protocol packets. After segmentation, the segmented transport-layer protocol packets are provided to the compression stage 406, which compresses the HTTP headers and the HTTP body of the HTTP message using an appropriate compression algorithm. The compressed HTTP message is provided to the encryption stage 410, which encrypts the HTTP message. The encrypted packets are provided to the checksum stage 412, which calculates a checksum or other data that may be used to verify, authenticate, or otherwise validate the encrypted packets. The encrypted packets are provided to the transmit stage 414, which transmits the encrypted packets over the network 104 to the receiving computing device 102.

The encrypted, transport-layer protocol packets are received by the receive stage 416 of the receive pipeline 504. The received packets are provided to the checksum stage 418, which verifies the checksum or other data included in each received packet. After verifying the checksum data, the received packets are provided to the decryption stage 420, which decrypts the encrypted HTTP message included in the received packets. After decryption, the decrypted packets are provided to the decompression stage 424, which decompresses the HTTP headers and the HTTP body using an appropriate compression algorithm. The decompressed HTTP message is provided to the coalesce stage 422, which may combine multiple received transport-layer protocol packets into a single HTTP message. The coalesced HTTP message is provided to the steering/completion stage 426, which writes the received HTTP message to a receive queue or other receive buffer.

Referring now to FIG. 6, schematic diagram 600 illustrates packet processing pipelines that may be established by the system 100. Illustratively, a transmit pipeline 602 is established by a NIC 132a, which may be including in a transmitting computing device 102, and a receive pipeline 604 is established by a NIC 132b, which may be included in a receiving computing device 102. The operations of each pipeline 602, 604 may be performed by one or more components of an environment 200 of a computing device 102 as shown in FIG. 2. For example, each stage of the pipelines 602, 604 may be embodied as hardware, microcode, firmware, or other resources of the respective NIC 132a, 132b. As described above, the pipelines 602, 604 may be configured by the NIC driver 206 of the respective computing device 102.

As shown in FIG. 6, an HTTP message for transmission is provided to the compression stage 406 of the transmit pipeline 602, which compresses the HTTP headers and the HTTP body of the HTTP message using an appropriate compression algorithm. The compressed HTTP message is provided to the encryption stage 410, which encrypts the HTTP message. The encrypted HTTP message is provided to the segmentation stage 408, which may segment or otherwise divide the encrypted HTTP message into multiple, smaller transport-layer protocol packets. After segmentation, the segmented packets are provided to the checksum stage 412, which calculates a checksum or other data that may be used to verify, authenticate, or otherwise validate the encrypted packets. The encrypted packets are provided to a transmit stage 414, which transmits the encrypted packets over the network 104 to the receiving computing device 102.

The encrypted, transport-layer protocol packets are received by the receive stage 416 of the receive pipeline 604. The received packets are provided to the checksum stage 418, which verifies the checksum or other data included in each received packet. After verifying the checksum data, the received packets are provided to the coalesce stage 422, which may combine multiple received transport-layer protocol packets into a single HTTP message. The coalesced, encrypted HTTP message is provide to the decryption stage 420, which decrypts the encrypted HTTP message included in the received packets. After decryption, the decrypted packets are provided to the decompression stage 424, which decompresses the HTTP headers and the HTTP body using an appropriate compression algorithm. The decompressed HTTP message is provided to a steering/completion stage 426, which writes the received HTTP message to a receive queue or other receive buffer. The steering/completion stage 426 may analyze the content of one or more HTTP headers to identify a particular receive queue or otherwise filter the received HTTP messages.

Figure 7:
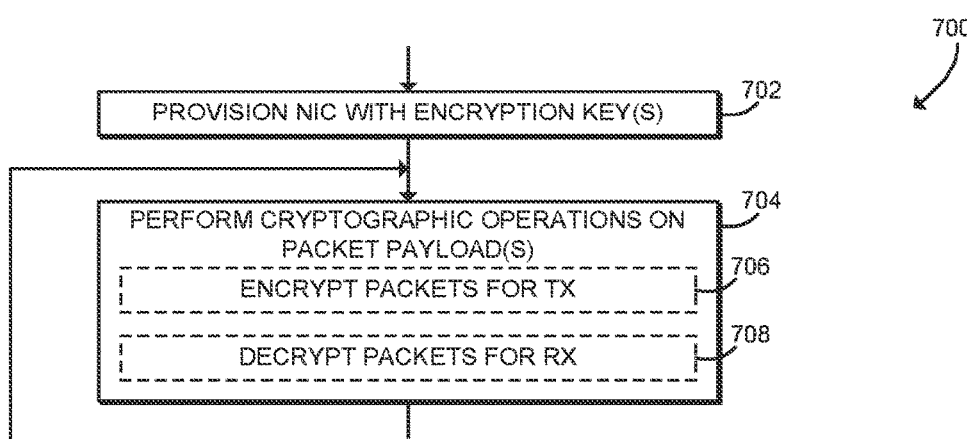
FIG. 7 is a simplified flow diagram of at least one embodiment of a method for accelerated packet encryption and decryption that may be executed by a computing device of FIGS. 1-2.

Referring now to FIG. 7, in use, the computing device 102 may execute a method 700 for accelerated packet encryption and decryption. It should be appreciated that, in some embodiments, the operations of the method 700 may be performed by one or more components of the environment 200 of the computing device 102 as shown in FIG. 2, including one or more pipeline stages of the pipelines as shown in FIGS. 4-6. The method 700 begins in block 702, in which the NIC 132 is provisioned with one or more encryption keys associated with a secure connection (e.g., with a particular SSL/TLS connection). For example, as described above, the NIC driver 206 may program the NIC 132 with the encryption keys. The NIC 132 may be programmed with the encryption keys when a secure connection is opened with a remote host or when the secure connection is otherwise initialized. The encryption keys may be established with the remote host, for example, using a secure key exchange or other secure process. The encryption keys may be stored by the NIC 132 for the lifetime of the associated secure connection, or in some embodiments, may change during the lifetime of the associated secure connection.

In block 704, the NIC 132 performs one or more cryptographic operations on an HTTP message included in one or more packet payloads. The NIC 132 may perform any appropriate cryptographic algorithm for the HTTP application 202 and/or the transport-layer protocol in use. For example, the NIC 132 may perform TLS 1.2 or TLS 1.3 encryption or decryption for HTTP traffic transmitted with TCP/IP. For QUIC packets, the NIC 132 may perform TLS 1.3 encryption/decryption or any other cryptographic algorithm appropriate for QUIC packets.

In some embodiments, in block 706, the NIC 132 may encrypt the contents of one or more packets for transmission. The NIC 132 may encrypt the entire HTTP message, including HTTP headers and the HTTP body. To do so, the NIC 132 may replace the plaintext payload of each transport-layer protocol packet associated with the HTTP message with an encrypted payload. The NIC 132 may also calculate authentication data for each of the encrypted packets, such as a checksum, a signature, an authentication tag, or other information that may be used to verify that the encrypted packet is authentic or otherwise has not been tampered with. In some embodiments, in block 708, the NIC 132 may decrypt the contents of one or more received packets. The NIC 132 may decrypt the entire HTTP message, including HTTP headers and the HTTP body. For example, the NIC 132 may replace an encrypted payload of each received transport-layer protocol packet associated with the HTTP message with a plain text payload. The NIC 132 may also verify authentication data for each of the encrypted packets, such as a checksum, a signature, an authentication tag, or other information that may be used to verify the encrypted packet. After performing the cryptographic operation(s), the method 700 loops back to block 704 to continue performing cryptographic operations.

Figure 8:
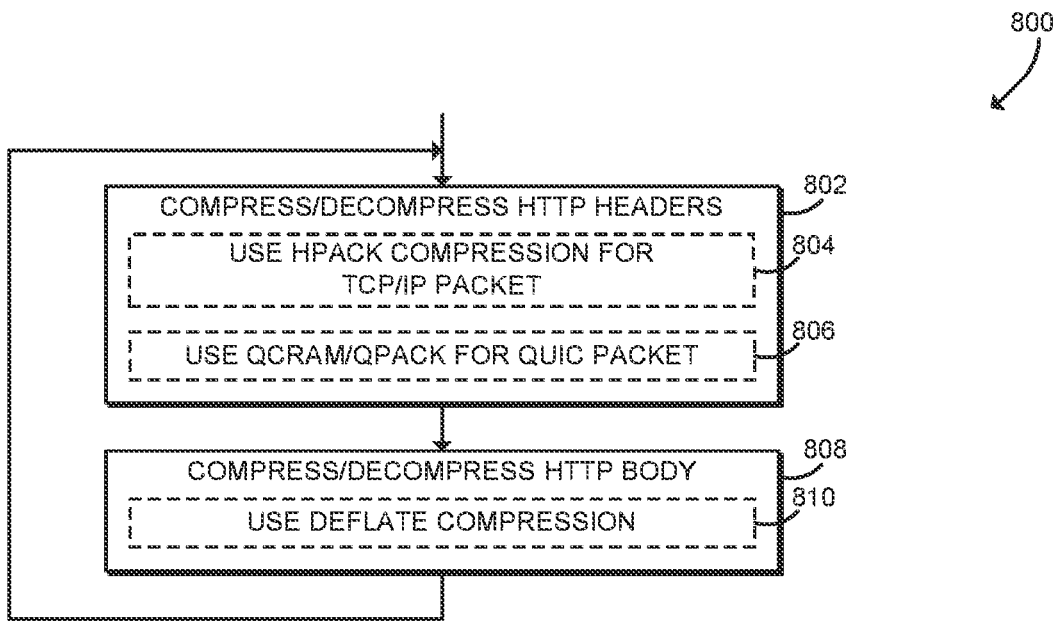
FIG. 8 is a simplified flow diagram of at least one embodiment of a method for accelerated packet compression and decompression that may be executed by a computing device of FIGS. 1-2.

Referring now to FIG. 8, in use, the computing device 102 may execute a method 800 for accelerated packet compression and decompression. It should be appreciated that, in some embodiments, the operations of the method 800 may be performed by one or more components of the environment 200 of the computing device 102 as shown in FIG. 2 including one or more pipeline stages of the pipelines as shown in FIGS. 4-6. The method 800 begins in block 802, in which the NIC 132 compresses or decompresses HTTP headers of the HTTP message. The NIC 132 may compress the HTTP headers when transmitting the message and decompress the HTTP headers when receiving the message. The NIC 132 may compress/decompress the headers using any compression algorithm appropriate for the HTTP protocol and/or transport-layer protocol in use. In some embodiments, in block 804 the NIC 132 may use an HPCACK compression algorithm for HTTP headers transmitted with TCP/IP packets. HPACK is a lossless compression format that may be used for efficiently representing HTTP header fields, and may be used with the HTTP/2 protocol. HPACK eliminates redundant header fields, limits vulnerability to known security attacks, and has a bounded memory requirement. In some embodiments, in block 806 the NIC 132 may use a QCRAM or QPACK compression algorithm for HTTP headers transmitted with QUIC packets. QPACK is an extension to HPACK that may allow the transmitter to avoid unnecessary head-of-line blocking when used with QUIC.

In block 808, the NIC 132 may compress or decompress the HTTP body of the HTTP message. The NIC 132 may use any appropriate compression algorithm for the HTTP protocol. In some embodiments, in block 810 the NIC 132 may use a DEFLATE compression algorithm. Additionally or alternatively, the NIC 132 may use a different LZ77-based algorithm, such as gzip. After compressing or decompressing the HTTP message, the method 800 loops back to block 802 to continue performing compression operations.

Figure 9:
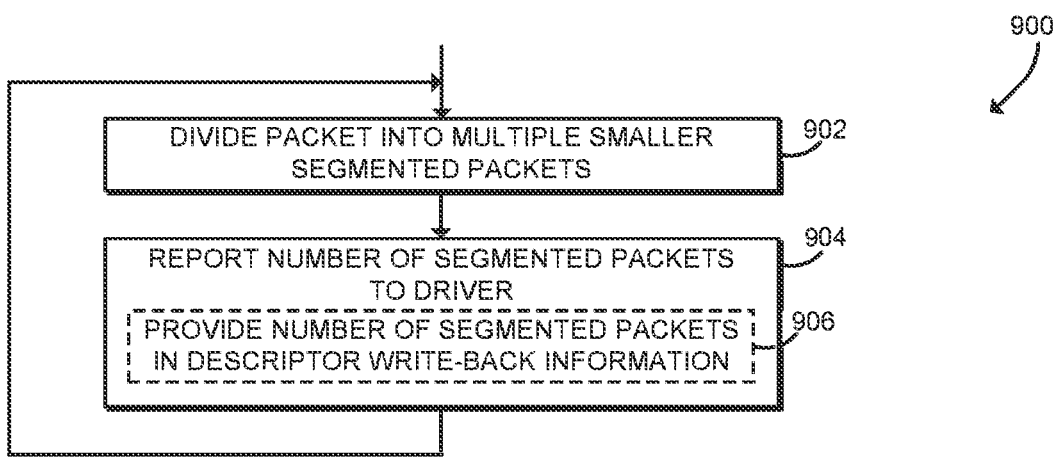
FIG. 9 is a simplified flow diagram of at least one embodiment of a method for accelerated packet segmentation that may be executed by a computing device of FIGS. 1-2.

Referring now to FIG. 9, in use, the computing device 102 may execute a method 900 for accelerated packet segmentation or large send offload (LSO). It should be appreciated that, in some embodiments, the operations of the method 900 may be performed by one or more components of the environment 200 of the computing device 102 as shown in FIG. 2 including one or more pipeline stages of the pipelines as shown in FIGS. 4-6. The method 900 begins in block 902, in which the NIC 132 divides a transport-layer protocol packet into multiple, smaller packets. The input transport-layer protocol packet may have a size greater than the maximum segment size (MSS) of the network 104 and/or of other devices of the system 100. The resulting segmented packets each have a size smaller than the MSS. Each of the smaller packets may include payload data (e.g., plain text, compressed, and/or encrypted HTTP message data) copied or otherwise extracted from the large packet. The NIC 132 may copy a transport-layer protocol packet header from the larger input packet into each of the segmented packets. The NIC 132 may also update the packet number in each of the segmented transport-layer packets and/or may update other fields in IP, TCP, UDP, or other headers of the segmented transport-layer packets.

In block 904, the NIC 132 reports the number of generated segmented transport-layer packets to the NIC driver 206 or other software of the computing device 102. The driver 206, protocol stack 204, and/or other software executed by the computing device 102 may not be able to determine the number of transport-layer packets that are generated during segmentation. For example, the number of segmented packets may depend on the results of compression performed by the NIC 132. By providing the number of packets to the driver 206 (and subsequently the protocol stack 204), the protocol stack 204 may be able to understand received acknowledgments and reset generation of new packet numbers. The number of segmented packets may be provided by the NIC 132 using any appropriate technique. In some embodiments, in block 906, the NIC 132 may provide the number of packets in descriptor write-back information available to the NIC driver 206. After reporting the number of packets, the method 900 loops back to block 902 to continue segmenting packets.

Figure 10:
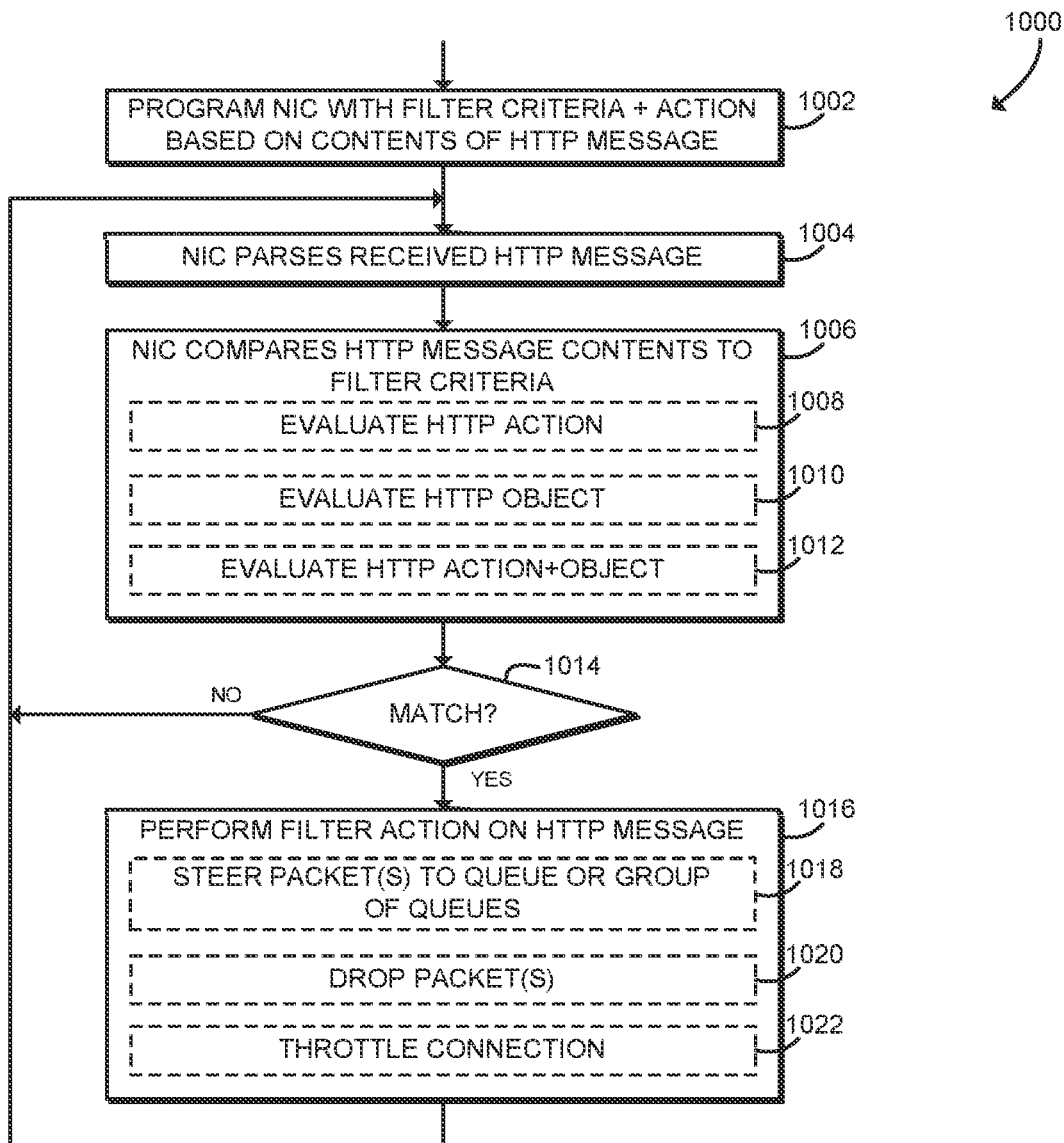
FIG. 10 is a simplified flow diagram of at least one embodiment of a method for accelerated packet steering that may be executed by the computing device of FIGS. 1-2.

Referring now to FIG. 10, in use, the computing device 102 may execute a method 1000 for accelerated packet steering. It should be appreciated that, in some embodiments, the operations of the method 1000 may be performed by one or more components of the environment 200 of the computing device 102 as shown in FIG. 2 including one or more pipeline stages of the pipelines shown in FIGS. 4-6. The method 1000 begins in block 1002, in which the NIC driver 206 programs the NIC 132 with one or more filter criteria and associated actions that are based on the contents of received HTTP messages. The criteria may, for example, identify contents of one or more HTTP headers.

In block 1004, the NIC 132 parses an HTTP message received from a remote computing device. In particular, the NIC 132 may extract or otherwise examine the plain text contents of one or more HTTP headers. Thus, the NIC 132 may parse the HTTP message after the transport-layer protocol packets have been decrypted, decompressed, coalesced, and/or otherwise processed by the NIC 132.

In block 1006, the NIC 132 compares the received HTTP message contents to the filter criteria previously programmed to the NIC 132. In some embodiments, in block 1008 the NIC 132 may compare the action of an HTTP request to the filter criteria. HTTP actions may include verbs such as GET, PUT, POST, PATCH, or other HTTP actions. In some embodiments, in block 1010, the NIC 132 may compare an object of the HTTP request to the filter criteria, such as a specified URI or other resource identifier. In some embodiments, in block 1012, the NIC 132 may compare both the HTTP action and object to the filter criteria. In block 1014, the NIC 132 determines whether any filter criteria matches the received HTTP message. If not, the method 1000 loops back to block 1004 to parse additional HTTP requests. In some embodiments, the computing device 102 may perform a default action, such as dropping the HTTP request or processing the HTTP request according to defaults of the NIC driver 206 and/or the protocol stack 204. Referring back to block 1014, if filter criteria match the HTTP request, the method 1000 branches to block 1016.

In block 1016, the NIC 132 performs an associated filter action on the matching HTTP message. In some embodiments, in block 1018, the NIC 132 may steer the packets of the HTTP message to a receive queue or group of receive queues. Each receive queue may be associated with a particular processor core 122. The processor core 122 processes the HTTP messages in the associated receive queue, and may perform network processing and/or application processing on the HTTP message. For example, the receive queue may be processed by the NIC driver 206, the protocol stack 204, and/or the HTTP application 202. Thus, by steering the HTTP message to a particular receive queue, the NIC 132 can direct processing of certain HTTP messages by particular processor cores 122. The NIC 132 may spread received HTTP messages evenly among processor cores 122 to allow for parallel processing by multiple processor cores 122 (e.g., performing hash-based spreading or other receive-side scaling (RSS)). As another example, the NIC 132 may filter particular HTTP messages to particular processor cores 122, for example to provide processor affinity. In some embodiments, in block 1020 the NIC 132 may drop packets of the HTTP message that matches the filter criteria. In some embodiments, in block 1022, the NIC 132 may throttle the connection associated with the HTTP message that matches the filter criteria. After performing the filter action, the method 1000 loops back to block 1004 to continue parsing HTTP messages.

It should be appreciated that, in some embodiments, the methods 300, 700, 800, 900, and/or 1000 may be embodied as various instructions stored on a computer-readable media, which may be executed by the processor 120, the NIC 132, the accelerator 134, and/or other components of the computing device 102 to cause the computing device 102 to perform the respective method 300, 700, 800, 900, and/or 1000. The computer-readable media may be embodied as any type of media capable of being read by the computing device 102 including, but not limited to, the memory 126, the data storage device 128, firmware devices, microcode, other memory or data storage devices of the computing device 102, portable media readable by a peripheral device 136 of the computing device 102, and/or other media.

Examples

Illustrative examples of the technologies disclosed herein are provided below. An embodiment of the technologies may include any one or more, and any combination of, the examples described below.

Example 1 includes a computing device for accelerated packet processing, the computing device comprising: a network controller; an HTTP application to generate an HTTP message to a remote computing device, wherein the HTTP message comprises an application layer protocol message that includes an HTTP header; a protocol stack to frame the HTTP message to generate a transport protocol packet, wherein the transport protocol packet includes the HTTP message; and a network controller driver to pass the transport protocol packet to the network controller of the computing device; wherein the network controller comprises: a compression accelerator to compress the HTTP header of the HTTP message of the transport protocol packet to generate a compressed HTTP message of the transport protocol packet; and a cryptographic accelerator to encrypt the compressed HTTP message of the transport protocol packet to generate an encrypted HTTP message of the transport protocol packet in response to compression of the HTTP header; and wherein the network controller is to control transmission of the transport protocol packet to the remote computing device in response to encryption of the compressed HTTP message.

Example 2 includes the subject matter of Example 1, and wherein the transport protocol packet comprises a TCP/IP packet.

Example 3 includes the subject matter of any of Examples 1 and 2, and wherein to compress the HTTP header comprises to compress the HTTP header with an HPACK compression algorithm.

Example 4 includes the subject matter of any of Examples 1-3, and wherein the transport protocol packet comprises a QUIC packet.

Example 5 includes the subject matter of any of Examples 1-4, and wherein to compress the HTTP header comprises to compress the HTTP header with a QPACK compression algorithm.

Example 6 includes the subject matter of any of Examples 1-5, and wherein: the HTTP message further includes an HTTP body; the compression accelerator is further to compress the HTTP body of the HTTP message to generate the compressed HTTP message; and to encrypt the compressed HTTP message further comprises to encrypt the compressed HTTP message in response to compression of the HTTP body.

Example 7 includes the subject matter of any of Examples 1-6, and wherein to compress the HTTP body comprises to compress the HTTP body with a DEFLATE compression algorithm.

Example 8 includes the subject matter of any of Examples 1-7, and wherein the network controller driver is further to configure a transmit pipeline of the network controller, wherein the transmit pipeline includes an offload ordering.

Example 9 includes the subject matter of any of Examples 1-8, and wherein: the network controller further comprises a segmentation accelerator to segment the transport protocol packet to generate a plurality of segmented transport protocol packets; and to control transmission of the transport protocol packet further comprises to control transmission of the plurality of segmented transport protocol packets in response to segmentation of the transport protocol packet.

Example 10 includes the subject matter of any of Examples 1-9, and wherein the segmentation accelerator is further to report a count of the plurality of segmented transport protocol packets to the computing device in response to the segmentation of the transport protocol packet.

Example 11 includes the subject matter of any of Examples 1-10, and wherein: to compress the HTTP header comprises to compress the HTTP header in response to passing of the transport protocol packet to the network controller; to segment the transport protocol packet comprises to segment the transport protocol packet in response to the compression of the HTTP header, wherein the plurality of segmented transport protocol packets comprises the compressed HTTP message; to encrypt the HTTP message comprises to encrypt the plurality of segmented transport protocol packets in response to the segmentation of the transport protocol packet; and to control transmission of the transport protocol packet comprises to control transmission of the plurality of segmented transport protocol packets in response to encryption of the plurality of segmented transport protocol packets.

Example 12 includes the subject matter of any of Examples 1-11, and wherein: to segment the transport protocol packet comprises to segment the transport protocol packet in response to passing of the transport protocol packet to the network controller, wherein the plurality of segmented transport protocol packets comprises the HTTP message; and to compress the HTTP header comprises to compress the HTTP header in response to the segmentation of the transport protocol packet.

Example 13 includes the subject matter of any of Examples 1-12, and wherein: to compress the HTTP header comprises to compress the HTTP header in response to passing of the transport protocol packet to the network controller; and to segment the transport protocol packet comprises to segment the transport protocol packet in response to the encryption of the HTTP message, wherein the plurality of segmented transport protocol packets comprises the encrypted HTTP message.

Example 14 includes the subject matter of any of Examples 1-13, and wherein: the network controller driver is further to configure a transmit pipeline of the network controller, wherein the transmit pipeline includes an offload ordering; and the network controller is further to execute the transmit pipeline according to the offload ordering, wherein to execute the transmit pipeline comprises to compress the HTTP header, to encrypt the HTTP message, and to segment the transport protocol packet in an order specified by the offload ordering.

Example 15 includes a computing device for accelerated packet processing, the computing device comprising: a network controller to receive a transport protocol packet from a remote computing device, wherein the transport protocol packet comprises an encrypted HTTP message, wherein the network controller comprises: an encryption accelerator to decrypt the encrypted HTTP message of the transport protocol packet to generate a compressed HTTP message of the transport protocol packet; a compression accelerator to decompress the compressed HTTP message of the transport protocol packet to generate an HTTP message of the transport protocol packet in response to decryption of the encrypted HTTP message, wherein the HTTP message comprises an application layer protocol message that includes an HTTP header; and a steering offload accelerator to steer the HTTP message to a receive queue based on the HTTP header in response to decompression of the compressed HTTP message; and a protocol stack to process, by a first processor core of the computing device, the HTTP message from the receive queue in response to steering of the HTTP message.

Example 16 includes the subject matter of Example 15, and wherein the transport protocol packet comprises a TCP/IP packet.

Example 17 includes the subject matter of any of Examples 15 and 16, and wherein to decompress the compressed HTTP message comprises to decompress a compressed HTTP header with an HPACK compression algorithm to generate the HTTP header.

Example 18 includes the subject matter of any of Examples 15-17, and wherein the transport protocol packet comprises a QUIC packet.

Example 19 includes the subject matter of any of Examples 15-18, and wherein to decompress the compressed HTTP message comprises to decompress a compressed HTTP header with a QPACK compression algorithm to generate the HTTP header.

Example 20 includes the subject matter of any of Examples 15-19, and wherein to decompress the compressed HTTP message further comprises to decompress a compressed HTTP body to generate an HTTP body of the HTTP message.

Example 21 includes the subject matter of any of Examples 15-20, and wherein to decompress the compressed HTTP body comprises to decompress the compressed HTTP body with a DEFLATE compression algorithm.

Example 22 includes the subject matter of any of Examples 15-21, and further comprising a network controller driver to configure a receive pipeline of the network controller, wherein the receive pipeline includes an offload ordering.

Example 23 includes the subject matter of any of Examples 15-22, and wherein: the network controller further comprises a segmentation accelerator to coalesce a plurality of segmented transport protocol packets to generate the transport protocol packet, wherein the plurality of segmented transport protocol packets comprises the encrypted HTTP message; and to receive the transport protocol packet comprises to receive the plurality of segmented transport protocol packets.

Example 24 includes the subject matter of any of Examples 15-23, and wherein: to decrypt the encrypted HTTP message comprises to decrypt the encrypted HTTP message in response to receipt of the plurality of segmented transport protocol packets; to coalesce the plurality of segmented transport protocol packets comprises to coalesce the plurality of transport protocol packets in response to the decryption of the encrypted HTTP message; and to decompress the compressed HTTP message comprises to decompress the compressed HTTP message in response to coalescing of the plurality of segmented transport protocol packets.

Example 25 includes the subject matter of any of Examples 15-24, and wherein: to decrypt the encrypted HTTP message comprises to decrypt the encrypted HTTP message in response to receipt of the plurality of segmented transport protocol packets; to coalesce the plurality of segmented transport protocol packets comprises to coalesce the plurality of transport protocol packets in response to the decompression of compressed HTTP message; and to steer the HTTP message comprises to steer the HTTP message in response to coalescing of the plurality of segmented transport protocol packets.

Example 26 includes the subject matter of any of Examples 15-25, and wherein: to coalesce the plurality of segmented transport protocol packets comprises to coalesce the plurality of transport protocol packets in response to receipt of the plurality of segmented transport protocol packets; and to decrypt the encrypted HTTP message comprises to decrypt the encrypted HTTP message in response to coalescing of the plurality of segmented transport protocol packets.

Example 27 includes the subject matter of any of Examples 15-26, and further comprising: a network controller driver to configure a receive pipeline of the network controller, wherein the receive pipeline includes an offload ordering; wherein the network controller is further to execute the receive pipeline according to the offload ordering, wherein to execute the receive pipeline comprises to decrypt the encrypted HTTP message, to decompress the compressed HTTP message, and to coalesce the plurality of segmented transport protocol packets in an order specified by the offload ordering.

Example 28 includes the subject matter of any of Examples 15-27, and wherein to steer the HTTP message comprises to: determine whether the HTTP header of the HTTP message matches a filter criteria; and perform a filter action associated with the filter criteria in response to a determination that that the HTTP header matches the filter criteria.

Example 29 includes the subject matter of any of Examples 15-28, and wherein the filter criteria comprises an HTTP action or an HTTP object.

Example 30 includes the subject matter of any of Examples 15-29, and wherein to perform the filter action comprises to select the first processor core from a plurality of processor cores of the computing device.

Example 31 includes the subject matter of any of Examples 15-30, and wherein to perform the filter action comprises to drop the HTTP message or to throttle the HTTP message.

Example 32 includes the subject matter of any of Examples 15-31, and further comprising a network controller driver to configure the network controller with the filter criteria and the associated filter action.

Example 33 includes a method for accelerated packet processing, the method comprising: generating, by a computing device, an HTTP message to a remote computing device, wherein the HTTP message comprises an application layer protocol message that includes an HTTP header; framing, by the computing device, the HTTP message to generate a transport protocol packet, wherein the transport protocol packet includes the HTTP message; passing, by the computing device, the transport protocol packet to a network controller of the computing device; compressing, by the network controller, the HTTP header of the HTTP message of the transport protocol packet to generate a compressed HTTP message of the transport protocol packet; encrypting, by the network controller, the compressed HTTP message of the transport protocol packet to generate an encrypted HTTP message of the transport protocol packet in response to compressing the HTTP header; and controlling, by the network controller, transmission of the transport protocol packet to the remote computing device in response to encrypting the compressed HTTP message.

Example 34 includes the subject matter of Example 33, and wherein framing the HTTP message comprises framing the HTTP message to generate a TCP/IP packet that includes the HTTP message.

Example 35 includes the subject matter of any of Examples 33 and 34, and wherein compressing the HTTP header comprises compressing the HTTP header with an HPACK compression algorithm.

Example 36 includes the subject matter of any of Examples 33-35, and wherein framing the HTTP message comprises framing the HTTP message to generate a QUIC packet that includes the HTTP message.

Example 37 includes the subject matter of any of Examples 33-36, and wherein compressing the HTTP header comprises compressing the HTTP header with a QPACK compression algorithm.

Example 38 includes the subject matter of any of Examples 33-37, and wherein the HTTP message further includes an HTTP body, the method further comprising compressing, by the network controller, the HTTP body of the HTTP message to generate the compressed HTTP message, wherein encrypting the compressed HTTP message further comprises encrypting the compressed HTTP message in response to compressing the HTTP body.

Example 39 includes the subject matter of any of Examples 33-38, and wherein compressing the HTTP body comprises compressing the HTTP body with a DEFLATE compression algorithm.

Example 40 includes the subject matter of any of Examples 33-39, and further comprising configuring, by the computing device, a transmit pipeline of the network controller, wherein the transmit pipeline includes an offload ordering.

Example 41 includes the subject matter of any of Examples 33-40, and further comprising: segmenting, by the network controller, the transport protocol packet to generate a plurality of segmented transport protocol packets; wherein controlling transmission of the transport protocol packet further comprises controlling transmission of the plurality of segmented transport protocol packets in response to segmenting the transport protocol packet.

Example 42 includes the subject matter of any of Examples 33-41, and further comprising reporting, by the network controller, a count of the plurality of segmented transport protocol packets to the computing device in response to segmenting the transport protocol packet.

Example 43 includes the subject matter of any of Examples 33-42, and wherein: compressing the HTTP header comprises compressing the HTTP header in response to passing the transport protocol packet to the network controller; segmenting the transport protocol packet comprises segmenting the transport protocol packet in response to compressing the HTTP header, wherein the plurality of segmented transport protocol packets comprises the compressed HTTP message; encrypting the HTTP message comprises encrypting the plurality of segmented transport protocol packets in response to segmenting the transport protocol packet; and controlling transmission of the transport protocol packet comprises controlling transmission of the plurality of segmented transport protocol packets in response to encrypting the plurality of segmented transport protocol packets.

Example 44 includes the subject matter of any of Examples 33-43, and wherein: segmenting the transport protocol packet comprises segmenting the transport protocol packet in response to passing the transport protocol packet to the network controller, wherein the plurality of segmented transport protocol packets comprises the HTTP message; and compressing the HTTP header comprises compressing the HTTP header in response to segmenting the transport protocol packet.

Example 45 includes the subject matter of any of Examples 33-44, and wherein: compressing the HTTP header comprises compressing the HTTP header in response to passing the transport protocol packet to the network controller; and segmenting the transport protocol packet comprises segmenting the transport protocol packet in response to encrypting the HTTP message, wherein the plurality of segmented transport protocol packets comprises the encrypted HTTP message.

Example 46 includes the subject matter of any of Examples 33-45, and further comprising: configuring, by the computing device, a transmit pipeline of the network controller, wherein the transmit pipeline includes an offload ordering; and executing, by network controller, the transmit pipeline according to the offload ordering, wherein executing the transmit pipeline comprises compressing the HTTP header, encrypting the HTTP message, and segmenting the transport protocol packet in an order specified by the offload ordering.

Example 47 includes a method for accelerated packet processing, the method comprising: receiving, by a network controller of a computing device, a transport protocol packet from a remote computing device, wherein the transport protocol packet comprises an encrypted HTTP message; decrypting, by the network controller, the encrypted HTTP message of the transport protocol packet to generate a compressed HTTP message of the transport protocol packet; decompressing, by the network controller, the compressed HTTP message of the transport protocol packet to generate an HTTP message of the transport protocol packet in response to decrypting the encrypted HTTP message, wherein the HTTP message comprises an application layer protocol message that includes an HTTP header; steering, by the network controller, the HTTP message to a receive queue based on the HTTP header in response to decompressing the compressed HTTP message; and processing, by a first processor core of the computing device, the HTTP message from the receive queue in response to steering the HTTP message.

Example 48 includes the subject matter of Example 47, and wherein receiving the transport protocol packet comprises receiving a TCP/IP packet.

Example 49 includes the subject matter of any of Examples 47 and 48, and wherein decompressing the compressed HTTP message comprises decompressing a compressed HTTP header with an HPACK compression algorithm to generate the HTTP header.

Example 50 includes the subject matter of any of Examples 47-49, and wherein receiving the transport protocol packet comprises receiving a QUIC packet.

Example 51 includes the subject matter of any of Examples 47-50, and wherein decompressing the compressed HTTP message comprises decompressing a compressed HTTP header with a QPACK compression algorithm to generate the HTTP header.

Example 52 includes the subject matter of any of Examples 47-51, and wherein decompressing the compressed HTTP message further comprises decompressing a compressed HTTP body to generate an HTTP body of the HTTP message.

Example 53 includes the subject matter of any of Examples 47-52, and wherein decompressing the compressed HTTP body comprises decompressing the compressed HTTP body with a DEFLATE compression algorithm.

Example 54 includes the subject matter of any of Examples 47-53, and further comprising configuring, by the computing device, a receive pipeline of the network controller, wherein the receive pipeline includes an offload ordering.

Example 55 includes the subject matter of any of Examples 47-54, and further comprising: coalescing, by the network controller, a plurality of segmented transport protocol packets to generate the transport protocol packet, wherein the plurality of segmented transport protocol packets comprises the encrypted HTTP message; wherein receiving the transport protocol packet comprises receiving the plurality of segmented transport protocol packets.

Example 56 includes the subject matter of any of Examples 47-55, and wherein: decrypting the encrypted HTTP message comprises decrypting the encrypted HTTP message in response to receiving the plurality of segmented transport protocol packets; coalescing the plurality of segmented transport protocol packets comprises coalescing the plurality of transport protocol packets in response to decrypting the encrypted HTTP message; and decompressing the compressed HTTP message comprises decompressing the compressed HTTP message in response to coalescing the plurality of segmented transport protocol packets.

Example 57 includes the subject matter of any of Examples 47-56, and wherein: decrypting the encrypted HTTP message comprises decrypting the encrypted HTTP message in response to receiving the plurality of segmented transport protocol packets; coalescing the plurality of segmented transport protocol packets comprises coalescing the plurality of transport protocol packets in response to decompressing compressed HTTP message; and steering the HTTP message comprises steering the HTTP message in response to coalescing the plurality of segmented transport protocol packets.

Example 58 includes the subject matter of any of Examples 47-57, and wherein: coalescing the plurality of segmented transport protocol packets comprises coalescing the plurality of transport protocol packets in response to receiving the plurality of segmented transport protocol packets; and decrypting the encrypted HTTP message comprises decrypting the encrypted HTTP message in response to coalescing the plurality of segmented transport protocol packets.

Example 59 includes the subject matter of any of Examples 47-58, and further comprising: configuring, by the computing device, a receive pipeline of the network controller, wherein the receive pipeline includes an offload ordering; and executing, by the network controller, the receive pipeline according to the offload ordering, wherein executing the receive pipeline comprises decrypting the encrypted HTTP message, decompressing the compressed HTTP message, and coalescing the plurality of segmented transport protocol packets in an order specified by the offload ordering.

Example 60 includes the subject matter of any of Examples 47-59, and wherein steering the HTTP message comprises: determining whether the HTTP header of the HTTP message matches a filter criteria; and performing a filter action associated with the filter criteria in response to determining that the HTTP header matches the filter criteria.

Example 61 includes the subject matter of any of Examples 47-60, and wherein the filter criteria comprises an HTTP action or an HTTP object.

Example 62 includes the subject matter of any of Examples 47-61, and wherein performing the filter action comprises selecting the first processor core from a plurality of processor cores of the computing device.

Example 63 includes the subject matter of any of Examples 47-62, and wherein performing the filter action comprises dropping the HTTP message or throttling the HTTP message.

Example 64 includes the subject matter of any of Examples 47-63, and further comprising configuring, by the computing device, the network controller with the filter criteria and the associated filter action.

Example 65 includes one or more computer-readable storage media comprising a plurality of instructions stored thereon that, in response to being executed, cause a computing device to: generate an HTTP message to a remote computing device, wherein the HTTP message comprises an application layer protocol message that includes an HTTP header; frame the HTTP message to generate a transport protocol packet, wherein the transport protocol packet includes the HTTP message; pass the transport protocol packet to a network controller of the computing device; compress, by the network controller, the HTTP header of the HTTP message of the transport protocol packet to generate a compressed HTTP message of the transport protocol packet; encrypt, by the network controller, the compressed HTTP message of the transport protocol packet to generate an encrypted HTTP message of the transport protocol packet in response to compressing the HTTP header; and control, by the network controller, transmission of the transport protocol packet to the remote computing device in response to encrypting the compressed HTTP message.

Example 66 includes the subject matter of Example 65, and wherein to frame the HTTP message comprises to frame the HTTP message to generate a TCP/IP packet that includes the HTTP message.

Example 67 includes the subject matter of any of Examples 65 and 66, and wherein to compress the HTTP header comprises to compress the HTTP header with an HPACK compression algorithm.

Example 68 includes the subject matter of any of Examples 65-67, and wherein to frame the HTTP message comprises to frame the HTTP message to generate a QUIC packet that includes the HTTP message.

Example 69 includes the subject matter of any of Examples 65-68, and wherein to compress the HTTP header comprises to compress the HTTP header with a QPACK compression algorithm.

Example 70 includes the subject matter of any of Examples 65-69, and wherein the HTTP message further includes an HTTP body, the one or more computer-readable storage media further comprising a plurality of instructions stored thereon that, in response to being executed, cause the computing device to compress, by the network controller, the HTTP body of the HTTP message to generate the compressed HTTP message, wherein to encrypt the compressed HTTP message further comprises to encrypt the compressed HTTP message in response to compressing the HTTP body.

Example 71 includes the subject matter of any of Examples 65-70, and wherein to compress the HTTP body comprises to compress the HTTP body with a DEFLATE compression algorithm.

Example 72 includes the subject matter of any of Examples 65-71, and further comprising a plurality of instructions stored thereon that, in response to being executed, cause the computing device to configure a transmit pipeline of the network controller, wherein the transmit pipeline includes an offload ordering.

Example 73 includes the subject matter of any of Examples 65-72, and further comprising a plurality of instructions stored thereon that, in response to being executed, cause the computing device to: segment, by the network controller, the transport protocol packet to generate a plurality of segmented transport protocol packets; wherein to control transmission of the transport protocol packet further comprises to control transmission of the plurality of segmented transport protocol packets in response to segmenting the transport protocol packet.

Example 74 includes the subject matter of any of Examples 65-73, and further comprising a plurality of instructions stored thereon that, in response to being executed, cause the computing device to report, by the network controller, a count of the plurality of segmented transport protocol packets to the computing device in response to segmenting the transport protocol packet.

Example 75 includes the subject matter of any of Examples 65-74, and wherein: to compress the HTTP header comprises to compress the HTTP header in response to passing the transport protocol packet to the network controller; to segment the transport protocol packet comprises to segment the transport protocol packet in response to compressing the HTTP header, wherein the plurality of segmented transport protocol packets comprises the compressed HTTP message; to encrypt the HTTP message comprises to encrypt the plurality of segmented transport protocol packets in response to segmenting the transport protocol packet; and to control transmission of the transport protocol packet comprises to control transmission of the plurality of segmented transport protocol packets in response to encrypting the plurality of segmented transport protocol packets.

Example 76 includes the subject matter of any of Examples 65-75, and wherein: to segment the transport protocol packet comprises to segment the transport protocol packet in response to passing the transport protocol packet to the network controller, wherein the plurality of segmented transport protocol packets comprises the HTTP message; and to compress the HTTP header comprises to compress the HTTP header in response to segmenting the transport protocol packet.

Example 77 includes the subject matter of any of Examples 65-76, and wherein: to compress the HTTP header comprises to compress the HTTP header in response to passing the transport protocol packet to the network controller; and to segment the transport protocol packet comprises to segment the transport protocol packet in response to encrypting the HTTP message, wherein the plurality of segmented transport protocol packets comprises the encrypted HTTP message.

Example 78 includes the subject matter of any of Examples 65-77, and further comprising a plurality of instructions stored thereon that, in response to being executed, cause the computing device to: configure a transmit pipeline of the network controller, wherein the transmit pipeline includes an offload ordering; and execute, by network controller, the transmit pipeline according to the offload ordering, wherein executing the transmit pipeline comprises compressing the HTTP header, encrypting the HTTP message, and segmenting the transport protocol packet in an order specified by the offload ordering.

Example 79 includes one or more computer-readable storage media comprising a plurality of instructions stored thereon that, in response to being executed, cause a computing device to: receive, by a network controller of the computing device, a transport protocol packet from a remote computing device, wherein the transport protocol packet comprises an encrypted HTTP message; decrypt, by the network controller, the encrypted HTTP message of the transport protocol packet to generate a compressed HTTP message of the transport protocol packet; decompress, by the network controller, the compressed HTTP message of the transport protocol packet to generate an HTTP message of the transport protocol packet in response to decrypting the encrypted HTTP message, wherein the HTTP message comprises an application layer protocol message that includes an HTTP header; steer, by the network controller, the HTTP message to a receive queue based on the HTTP header in response to decompressing the compressed HTTP message; and process, by a first processor core of the computing device, the HTTP message from the receive queue in response to steering the HTTP message.

Example 80 includes the subject matter of Example 79, and wherein to receive the transport protocol packet comprises to receive a TCP/IP packet.

Example 81 includes the subject matter of any of Examples 79 and 80, and wherein to decompress the compressed HTTP message comprises to decompress a compressed HTTP header with an HPACK compression algorithm to generate the HTTP header.

Example 82 includes the subject matter of any of Examples 79-81, and wherein to receive the transport protocol packet comprises to receive a QUIC packet.

Example 83 includes the subject matter of any of Examples 79-82, and wherein to decompress the compressed HTTP message comprises to decompress a compressed HTTP header with a QPACK compression algorithm to generate the HTTP header.

Example 84 includes the subject matter of any of Examples 79-83, and wherein to decompress the compressed HTTP message further comprises to decompress a compressed HTTP body to generate an HTTP body of the HTTP message.

Example 85 includes the subject matter of any of Examples 79-84, and wherein to decompress the compressed HTTP body comprises to decompress the compressed HTTP body with a DEFLATE compression algorithm.

Example 86 includes the subject matter of any of Examples 79-85, and further comprising a plurality of instructions stored thereon that, in response to being executed, cause the computing device to configure a receive pipeline of the network controller, wherein the receive pipeline includes an offload ordering.

Example 87 includes the subject matter of any of Examples 79-86, and further comprising a plurality of instructions stored thereon that, in response to being executed, cause the computing device to: coalesce, by the network controller, a plurality of segmented transport protocol packets to generate the transport protocol packet, wherein the plurality of segmented transport protocol packets comprises the encrypted HTTP message; wherein to receive the transport protocol packet comprises to receive the plurality of segmented transport protocol packets.

Example 88 includes the subject matter of any of Examples 79-87, and wherein: to decrypt the encrypted HTTP message comprises to decrypt the encrypted HTTP message in response to receiving the plurality of segmented transport protocol packets; to coalesce the plurality of segmented transport protocol packets comprises to coalesce the plurality of transport protocol packets in response to decrypting the encrypted HTTP message; and to decompress the compressed HTTP message comprises to decompress the compressed HTTP message in response to coalescing the plurality of segmented transport protocol packets.

Example 89 includes the subject matter of any of Examples 79-88, and wherein: to decrypt the encrypted HTTP message comprises to decrypt the encrypted HTTP message in response to receiving the plurality of segmented transport protocol packets; to coalesce the plurality of segmented transport protocol packets comprises to coalesce the plurality of transport protocol packets in response to decompressing compressed HTTP message; and to steer the HTTP message comprises to steer the HTTP message in response to coalescing the plurality of segmented transport protocol packets.

Example 90 includes the subject matter of any of Examples 79-89, and wherein: to coalesce the plurality of segmented transport protocol packets comprises to coalesce the plurality of transport protocol packets in response to receiving the plurality of segmented transport protocol packets; and to decrypt the encrypted HTTP message comprises to decrypt the encrypted HTTP message in response to coalescing the plurality of segmented transport protocol packets.

Example 91 includes the subject matter of any of Examples 79-90, and further comprising a plurality of instructions stored thereon that, in response to being executed, cause the computing device to: configure a receive pipeline of the network controller, wherein the receive pipeline includes an offload ordering; and execute, by the network controller, the receive pipeline according to the offload ordering, wherein to execute the receive pipeline comprises to decrypt the encrypted HTTP message, to decompress the compressed HTTP message, and to coalesce the plurality of segmented transport protocol packets in an order specified by the offload ordering.

Example 92 includes the subject matter of any of Examples 79-91, and wherein to steer the HTTP message comprises to: determine whether the HTTP header of the HTTP message matches a filter criteria; and perform a filter action associated with the filter criteria in response to determining that the HTTP header matches the filter criteria.

Example 93 includes the subject matter of any of Examples 79-92, and wherein the filter criteria comprises an HTTP action or an HTTP object.

Example 94 includes the subject matter of any of Examples 79-93, and wherein to perform the filter action comprises to select the first processor core from a plurality of processor cores of the computing device.

Example 95 includes the subject matter of any of Examples 79-94, and wherein to perform the filter action comprises to drop the HTTP message or throttling the HTTP message.

Example 96 includes the subject matter of any of Examples 79-95, and further comprising a plurality of instructions stored thereon that, in response to being executed, cause the computing device to configure the network controller with the filter criteria and the associated filter action.

The invention claimed is:
1. A computing device comprising:
a network interface controller (NIC) comprising:
compression circuitry to compress a HTTP header of a HTTP message of a transport protocol packet to generate a compressed HTTP message of the transport protocol packet;
cryptographic circuitry to encrypt the compressed HTTP message of the transport protocol packet to generate an encrypted HTTP message of the transport protocol packet;
circuitry to control transmission of the transport protocol packet to a remote computing device; and
segmentation circuitry to segment the transport protocol packet to generate a plurality of segmented transport protocol packets, the circuitry to control transmission of the transport protocol packet to control transmission of the plurality of segmented transport protocol packets in response to the segmentation of the transport protocol packet.

2. The computing device of claim 1, wherein the transport protocol packet comprises a TCP/IP packet, the compression circuitry to compress the HTTP header with an HPACK compression algorithm.

3. The computing device of claim 1, wherein the transport protocol packet comprises a QUIC packet, the compression circuitry to compress the HTTP header with a QPACK compression algorithm.

4. The computing device of claim 1, wherein the HTTP message further includes an HTTP body, the compression circuitry to compress the HTTP body of the HTTP message to generate the compressed HTTP message, and the cryptographic circuitry to encrypt the compressed HTTP message in response to compression of the HTTP body.

5. The computing device of claim 1, wherein the network interface controller further comprises:
 a transmit pipeline, the transmit pipeline including an offload ordering, the offload ordering to specify an order of compression and encryption.

6. The computing device of claim 1, wherein the segmentation circuitry is further to report a count of the plurality of segmented transport protocol packets to the computing device in response to the segmentation of the transport protocol packet.

7. The computing device of claim 1, wherein to compress the HTTP header comprises to compress the HTTP header in response to passing of the transport protocol packet to the network interface controller, to segment the transport protocol packet comprises to segment the transport protocol packet in response to the compression of the HTTP header, the plurality of segmented transport protocol packets comprises the compressed HTTP message, to encrypt the HTTP message comprises to encrypt the plurality of segmented transport protocol packets in response to the segmentation of the transport protocol packet, and to control transmission of the transport protocol packet comprises to control transmission of the plurality of segmented transport protocol packets in response to encryption of the plurality of segmented transport protocol packets.

8. The computing device of claim 1, wherein to segment the transport protocol packet comprises to segment the transport protocol packet in response to passing of the transport protocol packet to the network interface controller, wherein the plurality of segmented transport protocol packets comprises the HTTP message, and to compress the HTTP header comprises to compress the HTTP header in response to the segmentation of the transport protocol packet.

9. The computing device of claim 1, wherein to compress the HTTP header comprises to compress the HTTP header in response to passing of the transport protocol packet to the network interface controller, and to segment the transport protocol packet comprises to segment the transport protocol packet in response to the encryption of the HTTP message, wherein the plurality of segmented transport protocol packets comprises the encrypted HTTP message.

10. One or more non-transitory computer-readable storage media comprising a plurality of instructions stored thereon that, in response to being executed, cause a computing device to:

compress, by a network interface controller (NIC) of the computing device, a HTTP header of a HTTP message of a transport protocol packet to generate a compressed HTTP message of the transport protocol packet;
 encrypt, by the network interface controller, the compressed HTTP message of the transport protocol packet to generate an encrypted HTTP message of the transport protocol packet;
 control, by the network interface controller, transmission of the transport protocol packet to a remote computing device in response to encrypting the compressed HTTP message;
 segment, by the network interface controller, the transport protocol packet to generate a plurality of segmented transport protocol packets; and
 control, by the network interface controller, transmission of the plurality of segmented transport protocol packets in response to the segmentation of the transport protocol packet.

11. The one or more non-transitory computer-readable storage media of claim 10, further comprising a plurality of instructions stored thereon that, in response to being executed, cause the computing device to:
 configure a transmit pipeline of the network interface controller, wherein the transmit pipeline includes an offload ordering; and
 execute, by network interface controller, the transmit pipeline according to the offload ordering, wherein to execute the transmit pipeline comprises to compress the HTTP header, encrypt the HTTP message, and segment the transport protocol packet in an order specified by the offload ordering.

12. The one or more non-transitory computer-readable storage media of claim 10, wherein the transport protocol packet comprises a TCP/IP packet, the network interface controller to compress the HTTP header with an HPACK compression algorithm.

13. The one or more non-transitory computer-readable storage media of claim 10, wherein the transport protocol packet comprises a QUIC packet, the network interface controller to compress the HTTP header with a QPACK compression algorithm.

14. The one or more non-transitory computer-readable storage media of claim 10, wherein the HTTP message further includes an HTTP body, the network interface controller to compress the HTTP body of the HTTP message to generate the compressed HTTP message, and to encrypt the compressed HTTP message in response to compression of the HTTP body.

\* \* \* \* \*